US012269256B2

(12) United States Patent
Hamada et al.

(10) Patent No.: US 12,269,256 B2
(45) Date of Patent: Apr. 8, 2025

(54) MEDIUM DRYING DEVICE AND RECORDING DEVICE

(71) Applicant: SEIKO EPSON CORPORATION, Tokyo (JP)

(72) Inventors: Nobuhiko Hamada, Shiojiri (JP); Koki Fukasawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 142 days.

(21) Appl. No.: 18/160,091

(22) Filed: Jan. 26, 2023

(65) Prior Publication Data

US 2023/0234376 A1 Jul. 27, 2023

(30) Foreign Application Priority Data

Jan. 27, 2022 (JP) ............................ JP2022-010755

(51) Int. Cl.
*B41J 11/00* (2006.01)

(52) U.S. Cl.
CPC ................................ *B41J 11/0024* (2021.01)

(58) Field of Classification Search
CPC .................................................... B41J 11/0024
See application file for complete search history.

(56) References Cited

U.S. PATENT DOCUMENTS 6,168,269 B1 * 1/2001 Rasmussen ................ B41J 2/01 347/102
2018/0272754 A1 * 9/2018 Matsuoka ............ B41J 11/0024

FOREIGN PATENT DOCUMENTS

DE 2717119 A1 * 10/1978 .......... B41J 11/0024
EP 2700507 A1 * 2/2014 .......... B41J 11/0015
JP 2020-152505 A 9/2020

* cited by examiner

*Primary Examiner* — Sharon Polk
(74) *Attorney, Agent, or Firm* — WORKMAN NYDEGGER

(57) ABSTRACT

A medium drying device that dries a liquid applied to a medium includes a front surface portion in contact with the medium at a first surface, a heat source unit provided on a second face side, a rear surface portion provided at a position opposing the second face with the heat source unit therebetween, a side surface portion disposed at a position opposing the heat source unit in a direction intersecting both the front surface portion and the rear surface portion, and a heat insulating material. The heat source unit opposes the second face without the heat insulating material therebetween, and the heat insulating material is disposed at a position opposing the rear surface portion and the heat source unit.

6 Claims, 7 Drawing Sheets

MEDIUM DRYING DEVICE AND RECORDING DEVICE

The present application is based on, and claims priority from JP Application Serial Number 2022-010755, filed Jan. 27, 2022, the disclosure of which is hereby incorporated by reference herein in its entirety.

BACKGROUND

1. Technical Field

The present disclosure relates to a medium drying device and a recording device.

2. Related Art

Medium drying devices of various configurations have been used. For example, JP 2020-152505 discloses a printing device including a heater that dries ink that has been discharged onto a medium.

A medium drying device that dries a liquid applied to a medium, such as the printing device of JP 2020-152505, usually has a configuration in which the medium is heated by a heater or the like to dry the liquid applied to the medium. A medium drying device having such a configuration needs to be able to dry the medium in a short amount of time, which has led to heating temperatures being increased in recent years. However, when the heating temperature is increased in the medium drying device with the above-described configuration in the related art, heat may be transferred to, for example, a component around the heating unit, thereby damaging the component. In light of this, reducing the drying time while minimizing adverse effects due to heating is preferable.

SUMMARY

A medium drying device according to the present disclosure for addressing the above problem is a medium drying device that dries a liquid applied to a medium, the medium drying device including a front surface portion in contact with the medium at a first surface, a heat source unit provided on a second face side, the second face being opposite to the first face, a rear surface portion provided at a position opposing the second face with the heat source unit therebetween, a side surface portion disposed at a position opposing the heat source unit in a direction intersecting both the front surface portion and the rear surface portion, and a heat insulating material. The heat source unit opposes the second face without the heat insulating material therebetween, and the heat insulating material is disposed at a position opposing the rear surface portion and the heat source unit.

DESCRIPTION OF EXEMPLARY EMBODIMENTS

Figure 1:
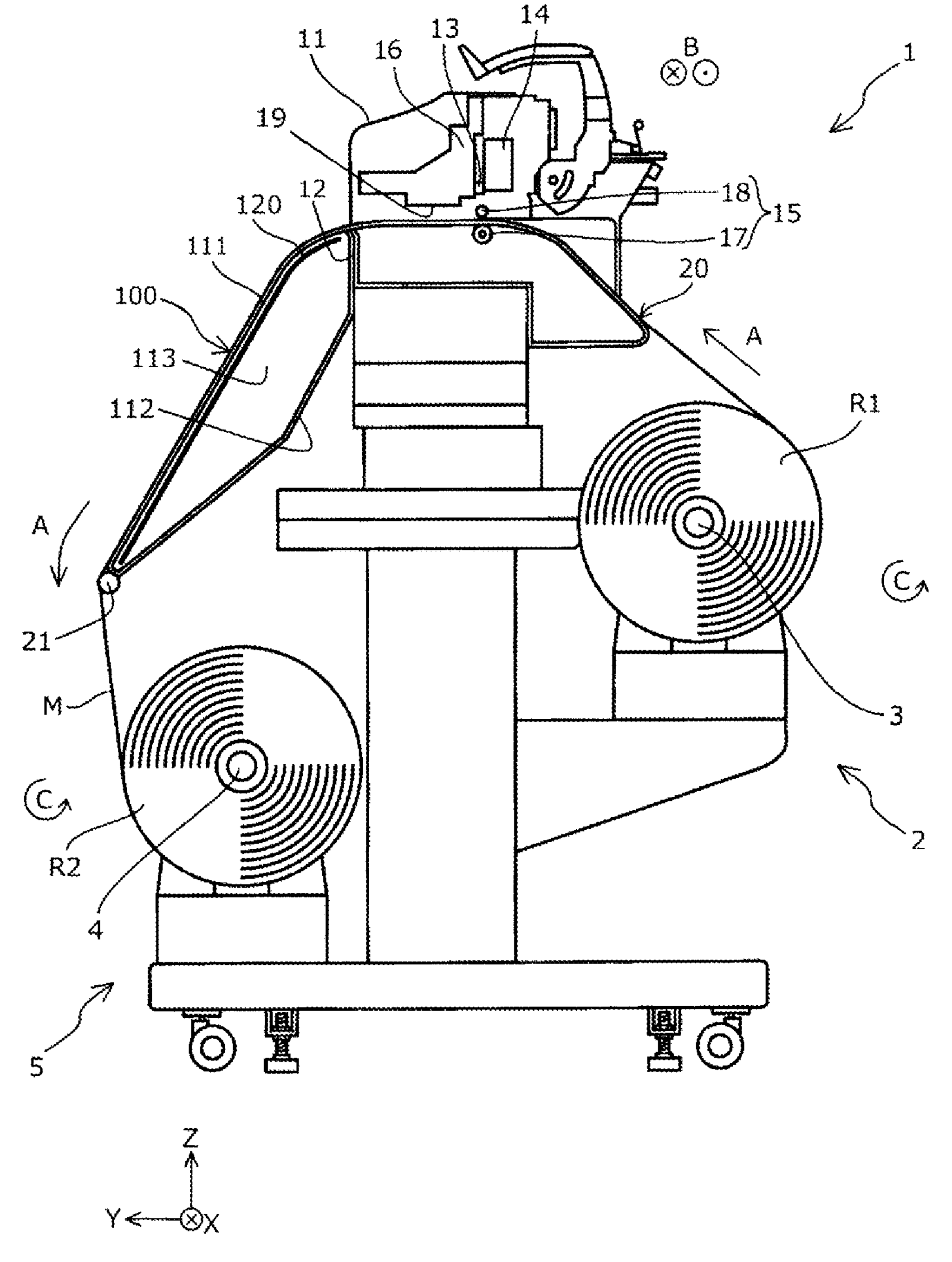
FIG. 1 is a schematic view of a recording device according to a first example of the disclosure.

First, the present disclosure will be schematically described.

A medium drying device according to a first aspect of the disclosure for addressing the above problem is a medium drying device that dries a liquid applied to a medium, the medium drying device including a front surface portion in contact with the medium at a first surface, a heat source unit provided on a second face side of the front surface portion, the second face being opposite to the first face, a rear surface portion provided at a position opposing the second face with the heat source unit therebetween, a side surface portion disposed at a position opposing the heat source unit in a direction intersecting both the front surface portion and the rear surface portion, and a heat insulating material. The heat source unit opposes the second face without the heat insulating material therebetween, and the heat insulating material is disposed at a position opposing the rear surface portion and the heat source unit.

According to this aspect, the heat source unit opposes the second face without the heat insulating material therebetween, and the heat insulating material is disposed at a position opposing the rear surface portion and the heat source unit. With this configuration, the heat source unit can efficiently heat the front surface portion from the second face side, can suppress heat transfer from the rear surface portion, and can suppress heat from escaping from the rear surface portion while heating the front surface portion in contact with the medium to a high temperature. Therefore, it is possible to reduce drying time while suppressing adverse effects due to heating.

A medium drying device according to a second aspect of the disclosure is the medium drying device according to the first aspect, in which a thermal conductivity of the heat insulating material is lower than a thermal conductivity of the front surface portion.

According to this aspect, the thermal conductivity of the heat insulating material is lower than the thermal conductivity of the front surface portion. With this configuration, it is possible to effectively reduce drying time while suppressing adverse effects due to heating.

A medium drying device according to a third aspect of the disclosure is the medium drying device according to the first or second aspect, in which the heat insulating material is disposed at the side surface portion at a position opposing the heat source unit.

According to this aspect, in the side surface portion, the heat insulating material is disposed at a position opposing the heat source unit. With this configuration, it is possible to suppress heat transfer not only from the rear surface portion but also from the side surface portion, and it is possible to effectively reduce drying time while suppressing adverse effects due to heating.

A medium drying device according to a fourth aspect of the disclosure is the medium drying device according to any of the first to third aspects, in which the heat source unit is in contact with the second face.

According to this aspect, the heat source unit is in contact with the second face. With this configuration, the heat source unit can efficiently heat the front surface portion, and it is possible to effectively reduce the drying time while suppressing adverse effects due to heating.

A recording device according to a fifth aspect of the disclosure includes the medium drying device according to any of the first to fourth aspects, and a recording unit configured to discharge ink as the liquid onto the medium.

According to this aspect, the recording device includes the recording unit that discharges the ink and can dry the medium to which the ink is applied. With this configuration, it is possible to reduce drying time of the ink applied to the medium while suppressing adverse effects due to heating.

A recording device according to a sixth aspect of the disclosure is the recording device according to the fifth aspect, the recording device further including an attachment portion used for attaching the medium drying device, in which a thermal conductivity of the heat insulating material is lower than a thermal conductivity of the attachment portion.

According to this aspect, the thermal conductivity of the heat insulating material is lower than the thermal conductivity of the attachment portion. With this configuration, it is possible to effectively reduce the drying time of the ink applied to the medium while suppressing adverse effects due to heating.

First Example

Embodiments of the disclosure will be described in detail below with reference to the accompanying drawings. First, an overview of a recording device 1 according to a first example of the disclosure will be described with reference to FIG. 1. Note that, in FIG. 1, some components are omitted for clarity of configuration. In the figures, the X-axis direction is a horizontal direction and the direction in which a shaft 3 of a medium setting portion 2 extends, the Y-axis direction is a horizontal direction and a direction orthogonal to the X-axis direction, and the Z-axis direction is a vertical direction. Additionally, hereinafter, the direction of an arrow is a + direction, and a direction opposite to the direction of the arrow is a − direction. For example, a vertical upward direction is a +Z-direction, and a vertical downward direction is a −Z-direction.

The recording device 1 according to this example includes the medium setting portion 2 that supports a roll body R1 configured of a wound sheet medium M to be subject to recording. In the recording device 1 according to this example, when the medium M is transported in a transport direction A, the shaft 3 of the medium setting portion 2 rotates in a rotation direction C. In this example, the roll body R1 is wound such that the recording surface to undergo recording faces outward. However, when the roll body R1 is wound such that the recording surface faces inward, the shaft 3 can rotate in a direction opposite to the rotation direction C to feed the medium M from the roll body R1.

The recording device 1 according to this example includes a transport path for the medium M. The transport path consists of a medium support portion 20 configured to support the medium M, for example. The recording device 1 includes a transport roller pair 15 including a driving roller 17 and a driven roller 18 for transporting the medium M in the transport direction A along the transport path. In the recording device 1 according to this example, the driving roller 17 is a roller extending in a width direction B intersecting the transport direction A, and a plurality of the driven rollers 18 are provided and arranged in the width direction B corresponding to the driving roller 17 at positions facing the driving roller 17. However, the configuration of the transport unit for the medium M is not particularly limited.

The medium support unit 20 is provided with a heater unit 100 configuring a part of the medium support portion 20. The heater unit 100 is attached to the recording device 1. Herein, the heater unit 100 can be regarded as a component of the recording device 1, and can also be regarded as a medium drying device that dries the medium M. Details of the heater unit 100 serving as the medium drying device of this example will be described later. In addition to the heater unit 100 that heats the medium M, a medium drying device that dries the medium M, such as a blower or an additional heater unit, may be provided.

The recording device 1 according to this example includes, inside a housing 11, a head 19 serving as a recording unit, and a carriage 16 used for mounting the head 19 and configured to reciprocate in the width direction B. The head 19 has a plurality of nozzles and discharges ink from the nozzles to perform recording. In the recording device 1 according to this example, the transport direction A at a position on the medium support portion 20 opposing the head 19 is a +Y-direction, a direction in which the head 19 moves is a direction along the X-axis direction, and a direction in which the ink is discharged is the −Z direction.

A plurality of frames 14 are formed inside the housing 11. A guide rail 13 formed inside the housing 11 is attached to one of the frames 14 and extends in the X-axis direction. The carriage 16 provided with the head 19 is attached to the guide rail 13.

With the configuration described above, the head 19 can perform recording on the transported medium M while reciprocating in the width direction B intersecting the transport direction A by discharging ink from the nozzles (not illustrated). The recording device 1 according to this example repeatedly transports the medium M in the transport direction A by a predetermined transport distance and, when the medium M comes to a halt, discharges ink while moving the head 19 in the width direction B. As a result, a desired image can be formed on the medium M. However, instead of the head having such a configuration, a configuration including a so-called line head in which nozzles that discharge ink are provided along the entire X-axis direction may be employed.

A medium take-up unit 5 configured to wind the medium M to form a roll body R2 is provided downstream of the head 19 in the transport direction A. In this example, since the medium M is wound such that the recording surface faces outward, a shaft 4 of the medium take-up unit 5 rotates in the rotation direction C when the medium M is wound. On the other hand, when the medium M is wound such that the recording surface faces inward, the shaft 4 can rotate in the direction opposite to the rotation direction C to wind the medium M.

A tension bar 21 configured to apply a desired tension to the medium M is provided between an end part of the medium support portion 20 downstream in the transport direction A and the medium take-up unit 5. A part of the tension bar 21 in contact with the medium M extends in the width direction B. However, such a configuration that is not provided with the tension bar 21 may be adopted. The recording device 1 according to this example has the configuration illustrated in FIG. 1, but is not limited to such a configuration. For example, a configuration in which cut paper or the like is used instead of the configuration in which the roll-shaped medium M is used may be employed.

Next, the heater unit 100, which is a main portion of the recording device 1 according to this example, will be described with reference to FIGS. 2 to 5. The heater unit 100 according to this example is a medium drying device that dries ink, which is liquid discharged from the head 19 of the recording device 1 onto the medium M. However, the heater unit 100 may be used in a device other than the recording device 1, and may be a medium drying device that dries a liquid other than ink applied to the medium M.

Figure 2:
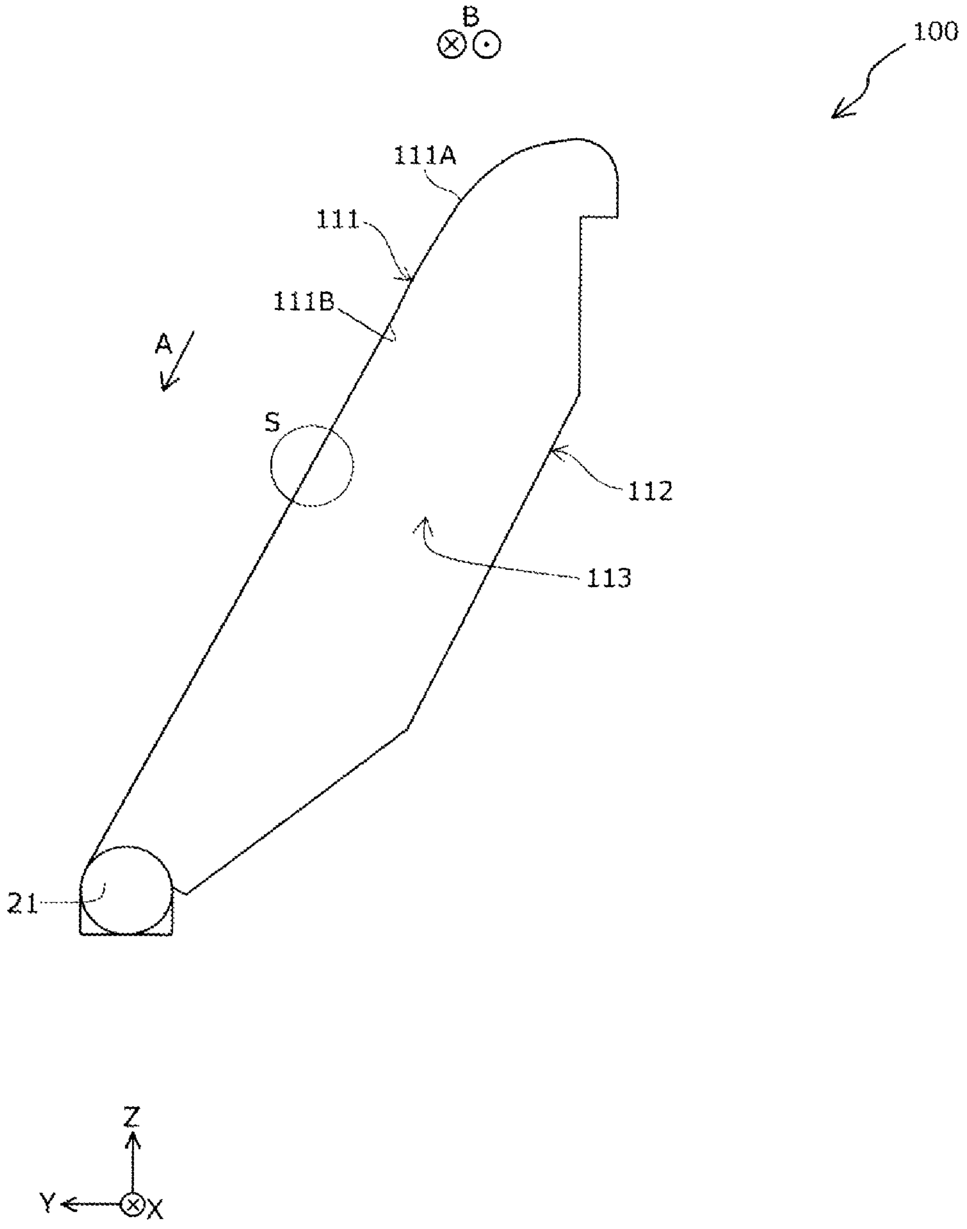
FIG. 2 is a side view of a medium drying device in the recording device according to the first example.
Figure 3:
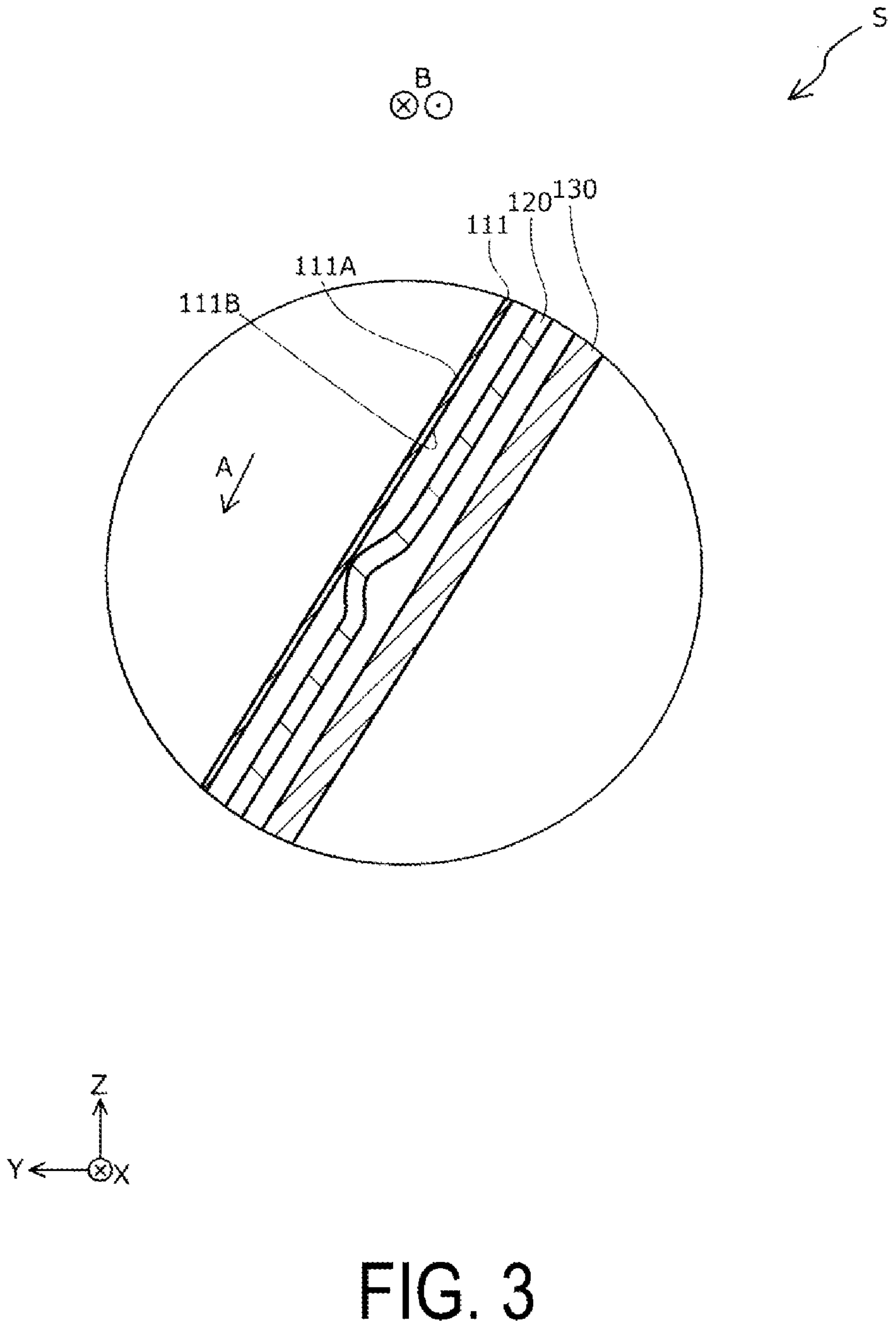
FIG. 3 is an enlarged side view of the internal structure of a region S in FIG. 2.
Figure 4:
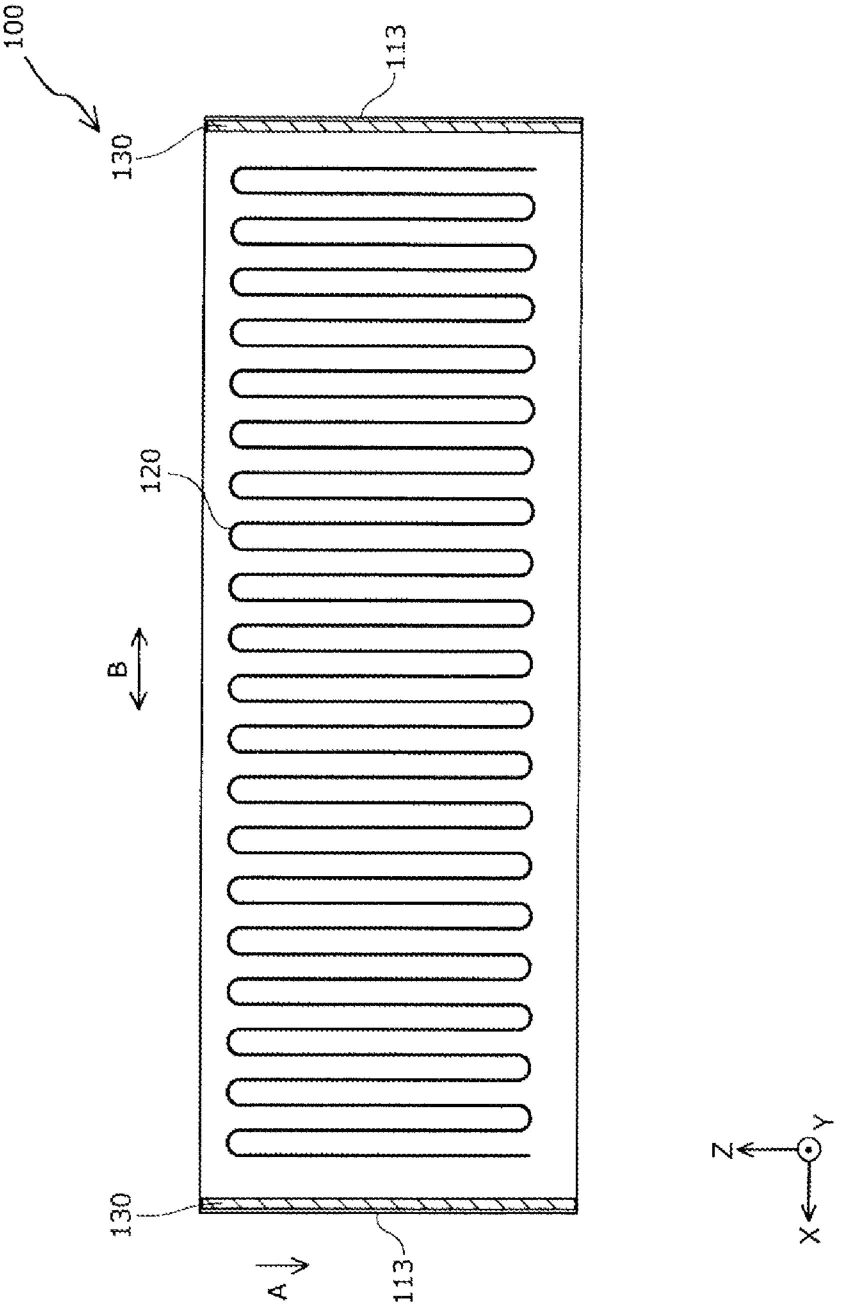
FIG. 4 is a see-through front view of the medium drying device in the recording device according to the first example.
Figure 5:
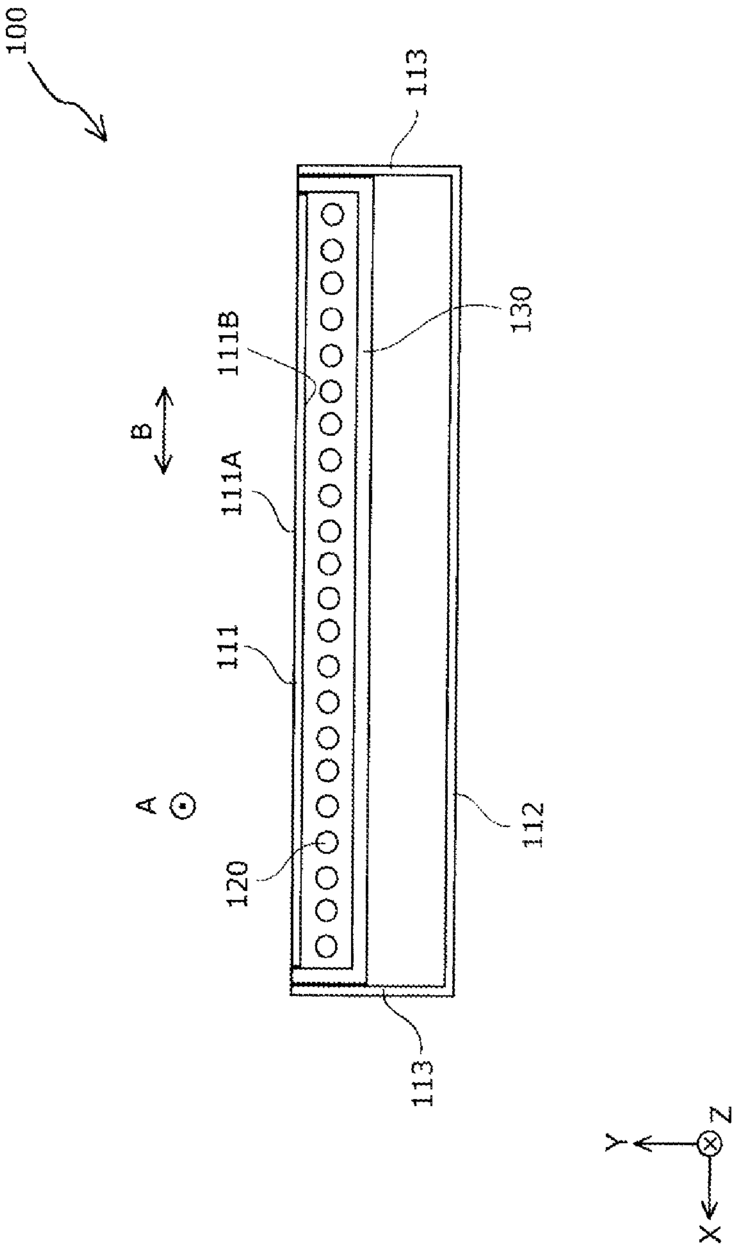
FIG. 5 is a schematic cross-sectional view of the medium drying device in the recording device according to the first example.

As illustrated in FIGS. 1 and 2, for example, the heater unit 100 of this example includes a front surface portion 111 in contact with the medium M at a first face 111A. As illustrated in FIGS. 3 and 5, for example, the heater unit 100 of this example includes a heat source unit 120 provided on the side of a second face 111B, which is a rear face relative to the first face 111A, of the front surface portion 111. As illustrated in FIG. 5, for example, the heater unit 100 of this example includes a rear surface portion 112 provided at a position opposing the second face 111B with the heat source unit therebetween 120. As illustrated in FIGS. 4 and 5, for example, the heater unit 100 of this example also includes a side surface portion 113 disposed at a position opposing the heat source unit 120 in the X-axis direction, which is a direction intersecting both the front surface portion 111 and the rear surface portion 112. Further, as illustrated in FIGS. 3 to 5, for example, the heater unit 100 of this example includes a heat insulating material 130.

As illustrated in FIGS. 3 and 5, for example, the heat source unit 120 opposes the second face 111B without the heat insulating material 130 present between the heat source unit 120 and the second face 111B. As illustrated in FIG. 5, for example, the heat insulating material 130 is disposed at a position opposing the rear surface portion 112 and the heat source unit 120. When the heater unit 100 according to this example has such a configuration, the heat source unit 120 can efficiently heat the front surface portion 111 from the second face 111B side, can suppress heat transfer from the rear surface portion 112, and can suppress heat from escaping from the rear surface portion 112 while heating the front surface portion 111 in contact with the medium M to a high temperature. Therefore, the heater unit 100 according to this example can reduce drying time while suppressing adverse effects due to heating.

In this example, the front surface portion 111, the rear surface portion 112, and the side surface portion 113 are made of metal, the heat source unit 120 is made of nichrome wire, and the heat insulating material 130 is made of glass fiber. However, the material, shape, size, and the like of the front surface portion 111, the rear surface portion 112, the side surface portion 113, the heat source unit 120, and the heat insulating material 130 are not particularly limited. The material, shape, size, and the like of the front surface portion 111, the rear surface portion 112, the side surface portion 113, the heat source unit 120, the heat insulating material 130, and the like can be appropriately determined as necessary. For example, the front surface portion 111, the rear surface portion 112, and the side surface portion 113 can be made of a metal such as aluminum, stainless steel, or iron, and the heat insulating material 130 can be made of glass fiber or urethane foam.

However, the thermal conductivity of the heat insulating material 130 is preferably lower than the thermal conductivity of the front surface portion 111. When the thermal conductivity of the heat insulating material 130 is lower than the thermal conductivity of the front surface portion 111, it is possible to effectively reduce the drying time while suppressing adverse effects due to heating.

As illustrated in FIGS. 4 and 5, in the heater unit 100 according to this example, the heat insulating material 130 is disposed at the side surface portion 113 at a position opposing the heat source unit 120. Therefore, the heater unit 100 according to this example can suppress heat transfer not only from the rear surface portion 112 but also from the side surface portion 113, and can effectively reduce drying time while suppressing adverse effects due to heating.

FIG. 5 illustrates a portion at which the heat source unit 120 is separated from the second face 111B, but as illustrated in FIG. 3, the heat source unit 120 is partially in contact with the second face 111B in the heater unit 100 of this example. Thus, the heat source unit 120 is preferably in contact with the second face 111B. This is because the heat source unit 120 can efficiently heat the front surface portion 111, the drying time can be effectively reduced while suppressing adverse effects due to heating.

Now, focusing on the recording device, the recording device 1 according to this example includes the head 19 that discharges ink as liquid onto the medium M, and the heater unit 100 described above. As described above, since the recording device 1 according to this example includes the head 19 serving as a recording unit that discharges ink and further includes the heater unit 100, the recording device 1 can dry the medium M to which ink is applied. Therefore, with the recording device 1 according to this example, it is possible to reduce drying time of the ink applied to the medium M while suppressing adverse effects due to heating.

As illustrated in FIG. 1, the recording device 1 of this example includes an attachment portion 12 for attaching the heater unit 100. The thermal conductivity of the heat insulating material 130 is lower than the thermal conductivity of the attachment portion 12. Thus, the thermal conductivity of the heat insulating material 130 is preferably lower than the thermal conductivity of the attachment portion 12. This is because, when the thermal conductivity of the heat insulating material 130 is lower than the thermal conductivity of the attachment portion 12, it is possible to effectively reduce drying time of the ink applied to the medium while suppressing adverse effects due to heating.

Second Example

Figure 6:
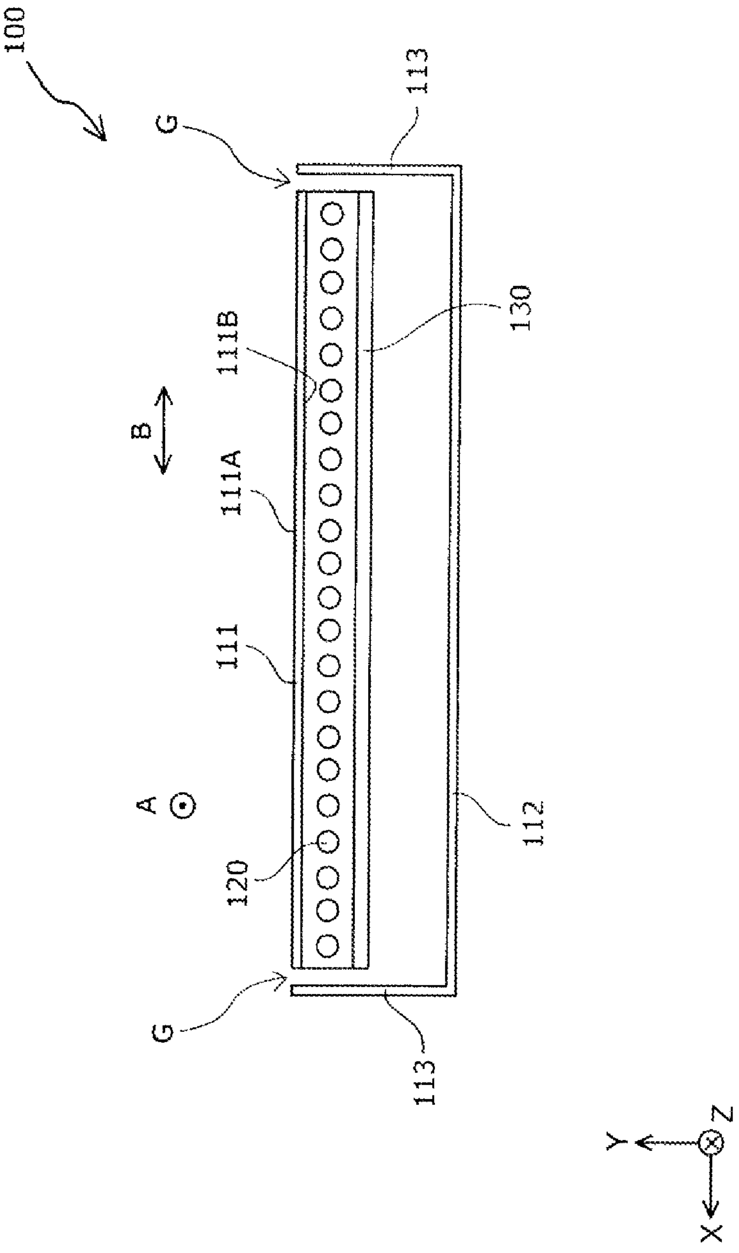
FIG. 6 is a schematic cross-sectional view of the medium drying device in a recording device according to a second example.

First, an overview of the heater unit 100 in the recording device 1 according to a second example will be described with reference to FIG. 6. FIG. 6 is a view corresponding to FIG. 5 and illustrates the heater unit 100 in the recording device 1 according to the first example. The heater unit 100 according to this example is the same as the heater unit 100 according to the first example except for the configurations described below, and thus has the same features as the heater unit 100 according to the first example. In FIG. 6, components common to the first example are denoted by the same reference signs, and detailed descriptions of those components will be omitted.

As illustrated in FIG. 6, in the heater unit 100 of this example, instead of the heat insulating material 130 provided between the heat source unit 120 and the side surface portion 113, a gap G is provided between the heat source unit 120 and the side surface portion 113. With such a configuration, heat transfer from the side surface portion 113 may not be suppressed to the same degree as with the heater unit 100 according to the first example, but heat transfer from the side surface portion 113 can be suppressed at a lower cost than in the heater unit 100 according to the first example. Further, the heat insulating material 130 may be provided between the heat source unit 120 and the side surface portion 113 as in the heater unit 100 of the first example, or the gap G may be provided between the heat source unit 120 and the side surface portion 113 as in the heater unit 100 of the present embodiment. With such a configuration, heat transfer from the side surface portion 113 can be particularly effectively suppressed.

Third Example

Figure 7:
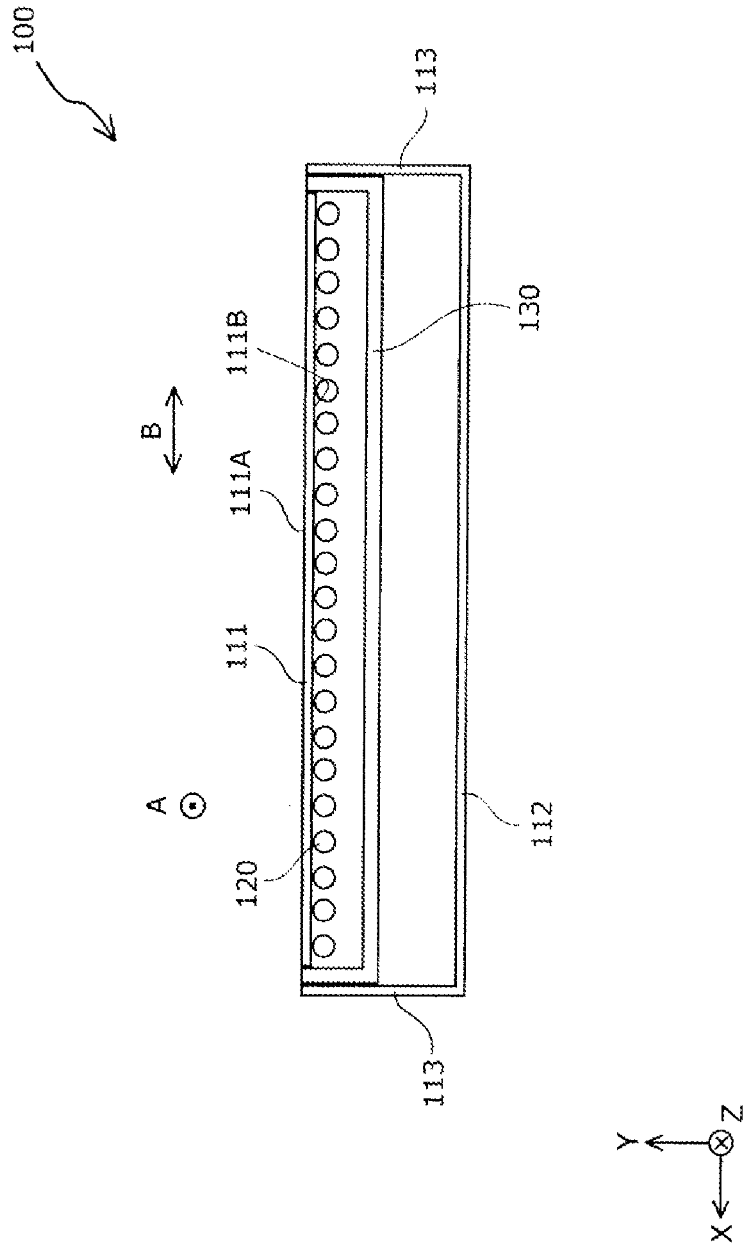
FIG. 7 is a schematic cross-sectional view of a medium drying device in a recording device according to a third example.

First, an overview of the heater unit 100 in the recording device 1 according to a third example will be described with reference to FIG. 7. FIG. 7 is a view corresponding to FIG. 5 and illustrates the heater unit 100 in the recording device 1 according to the first example. The heater unit 100 according to this example is the same as the heater unit 100 according to the first example and the second example except for the configurations described below, and thus has the same characteristics as the heater unit 100 according to the first example and the second example. In FIG. 7, components common to the first example and the second example are denoted by the same reference signs, and detailed descriptions of those components will be omitted.

As illustrated in FIG. 5, the heater unit 100 of the first example includes a portion at which the heat source unit 120 is separated from the second face 111B. Alternatively, as illustrated in FIG. 7, in the heater unit 100 according to this example, the entire surface of the heat source unit 120 is in contact with the second face 111B. For this reason, the heater unit 100 according to this example can more efficiently heat the front surface portion 111 by the heat source unit 120 than the heater unit 100 according to the first example, and can more effectively reduce drying time while suppressing adverse effects due to heating.

The present disclosure is not limited to the examples described above, and can be realized in various configurations without departing from the gist of the disclosure. Appropriate replacements or combinations may be made to the technical features in the present embodiments which correspond to the technical features in the aspects described in the SUMMARY section to solve some or all of the problems described above or to achieve some or all of the advantageous effects described above. Additionally, when the technical features are not described herein as essential technical features, such technical features may be deleted appropriately.

What is claimed is:

1. A medium drying device that dries a liquid applied to a medium, the medium drying device comprising:

a front surface portion in contact with the medium at a first face side of the front surface portion;

a heat source unit provided on a second face side of the front surface portion, the second face being opposite to the first face;

a rear surface portion provided at a position opposing the second face with the heat source unit therebetween;

a side surface portion disposed at a position opposing the heat source unit in a direction intersecting both the front surface portion and the rear surface portion; and a heat insulating material, wherein the heat source unit opposes the second face without the heat insulating material therebetween, the heat insulating material is disposed at a position opposing the rear surface portion and the heat source unit, and a thermal conductivity of the heat insulating material is lower than a thermal conductivity of the front surface portion.

2. The medium drying device according to claim 1, wherein the heat insulating material is disposed at the side surface portion at a position opposing the heat source unit.

3. The medium drying device according to claim 1, wherein the heat source unit is in contact with the second face.

4. A recording device comprising:

the medium drying device according to claim 1; and a recording unit configured to discharge ink as the liquid onto the medium.

5. The recording device according to claim 4, further comprising:

an attachment portion used for attaching the medium drying device to a medium support portion of the recording device, wherein a thermal conductivity of the heat insulating material is lower than a thermal conductivity of the attachment portion.

6. A medium drying device that dries a liquid applied to a medium, the medium drying device comprising:

a front surface portion in contact with the medium at a first face side of the front surface portion;

a heat source unit provided on a second face side of the front surface portion, the second face being opposite to the first face;

a rear surface portion provided at a position opposing the second face with the heat source unit therebetween;

a side surface portion disposed at a position opposing the heat source unit in a direction intersecting both the front surface portion and the rear surface portion; and a heat insulating material, wherein the heat source unit opposes the second face without the heat insulating material therebetween, the heat insulating material is disposed at a position opposing the rear surface portion and the heat source unit, and the heat insulating material is disposed at the side surface portion at a position opposing the heat source unit.

* * * * *